July 8, 1947.   C. L. EKSERGIAN ET AL   2,423,694
BRAKE MECHANISM
Filed Jan. 27, 1945

INVENTORS
Carolus L. Eksergian
Paul W. Gaenssle.
BY John P. Barbro
ATTORNEY

Patented July 8, 1947

2,423,694

UNITED STATES PATENT OFFICE 2,423,694

BRAKE MECHANISM

Carolus L. Eksergian and Paul W. Gaenssle, Detroit, Mich., assignors to The Budd Company, Philadelphia, Pa., a corporation of Pennsylvania Application January 27, 1945, Serial No. 574,892

5 Claims. (Cl. 188—59)

1

The invention relates to brake mechanism and more particularly to such mechanism adapted for association with vehicles such as railway trucks.

The invention has for an object the simplification of the support for the brake mechanism and the facilitation of its manufacture and assembly in the truck structure.

It is a further object to mount the support so as to cushion the road shocks and to connect the support to the truck frame in such manner as to minimize the strain on the parts under the braking torque.

It is a further object of the invention to provide a brake mechanism which is well adapted for use with the type of railway truck shown in co-pending application, Serial No. 569,492, filed December 23, 1944, and entitled "Rail car truck" and in which the main side frame members of the truck interconnecting the axles also serve as equalizers, these side members being interconnected by a transverse frame not interfering with the equalizing action of the side frame members but yet tying them together transversely and longitudinally, all as fully disclosed in said application. It will be understood, however, that the invention is also applicable to the usual type of passenger car truck having a truck frame interconnecting the axles and separate equalizers supporting said frame from the axles or to other types of trucks.

These and other objects and advantages and the manner in which they are attained will become apparent from the following detailed description when read in connection with the accompanying drawings forming a part of this specification.

Figure 1:
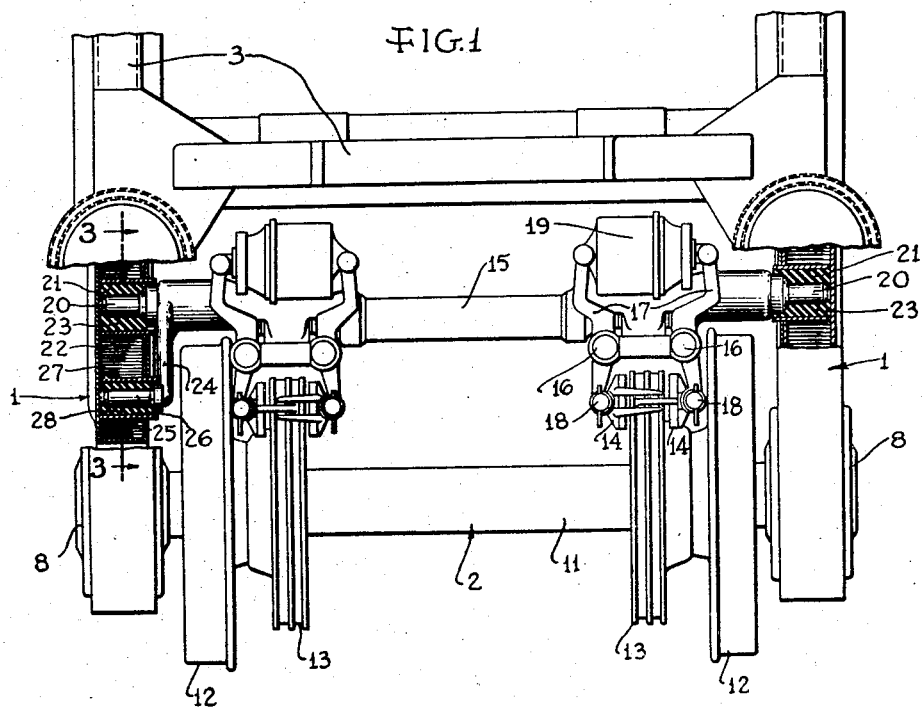
Fig. 1 is a plan view of one end of a railway truck showing the invention applied thereto, parts being broken away and shown in section.

The truck with which the brake mechanism of the invention is shown associated comprises the longitudinally extending side members or equalizers 1 interconnecting the spaced wheel and axle assemblies, as 2, and the rectangular frame 3 resiliently mounted on the side members 1 and also provided with means for tying the side members together both laterally and longitudinally in a manner which need not be described in detail herein.

Each side member may comprise a box-section

2 beam having a horizontally extending intermediate portion 4 merging at its ends in a generally vertically extending portion 5 forming, with a horizontal portion 6 extending from its upper end and a vertically downwardly extending portion 7, a pedestal guide opening for receiving the journal box 8 of the associated wheel and axle assembly 2. Resilient cushions, as 9, may be inserted between the top and sides of the journal box and the adjacent parts of the pedestal guide opening. A removable strap 10 may interconnect the bottoms of the vertical portions 5 and 7.

Each wheel and axle assembly may comprise an axle 11 having its ends rotatably supported in the respective journal boxes 8 and spaced wheels 12, 12 secured to the axle to rotate therewith.

Associated with each wheel 12 in a manner well known in the art is a brake rotor 13, in this instance a brake disc having radial braking faces on its opposite sides. A pair of brake stators, in this instance arcuate segmental shoes 14, 14, are arranged in cooperative relation with the opposite faces of the respective discs.

To support the shoes and their actuating means, a transversely extending supporting beam 15 is provided, this beam pivotally carrying for each disc, as at 16, 16, a pair of brake levers 17, 17 which pivotally carry, at 18, 18, an associated pair of shoes 14, 14, the levers being actuated by a power unit 19 such as the piston and cylinder interposed between their ends opposite the shoe ends.

The ends of the support beam have reduced extensions, as 20, which rest in recesses 21 in the respective side frames 1. These recesses may be formed by sleeves 22 welded or otherwise secured to the opposite inner and outer walls of the associated box-section frame member, and these sleeves are preferably of substantially greater diameter than the reduced diameter and extensions 20 of the beam, so that a rubber annulus 23 of substantial thickness may be interposed between them, as shown.

These rubber annuli form cushions for effectively cushioning the brake support and the parts carried thereby against road shocks. Further, they provide flexibility, permitting the necessary relative equalizing movements between the side frame members 1 and the slight relative movement between the wheel and axle assembly and the said frames without straining the parts unduly.

Figure 2:
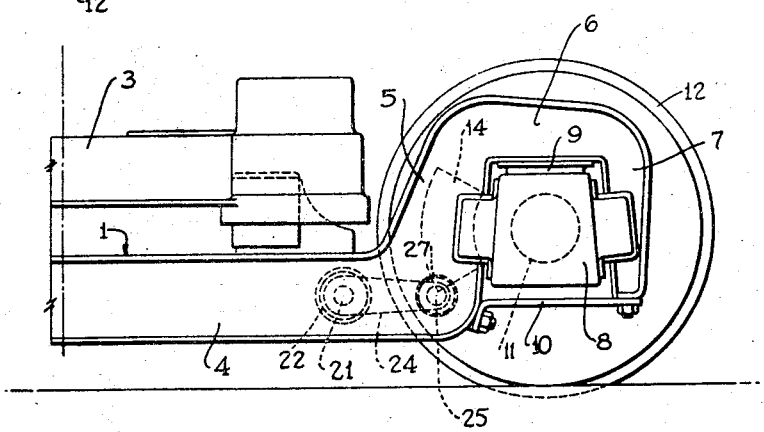
Fig. 2 is a side elevational view looking at the left-hand side of the parts of Fig. 1.

It will be noted by reference to Figs. 1 and 2 that the shoes 14 are offset toward the axle from the axis of the flexible joints 20, 22, 23 and are arranged substantially in the horizontal plane through the axle.

When the brakes are applied, a torque is thereby generated, tending to turn the support beam on its axis.

According to the invention, this tendency is resisted by a torque arm 24 rigidly secured to the beam 15 and having its free end formed with a horizontal projection 25 paralleling the adjacent reduced extension 20 of the support beam and resting in a recess 26 formed in the associated box-section beam, by a sleeve 27 secured thereto in a manner similar to the securement of sleeve 22, and to allow flexibility in the joint, the sleeve 27 is also of somewhat larger diameter than the projection 25 to permit the interposition between them of a rubber annulus 28.

While but a single torque arm 24 has been shown, and this is a generally desirable arrangement to avoid the imposition, by the brake support, of constraint upon the free relative movement of the equalizers at the opposite sides of the truck, it may in some cases be a more desirable arrangement to have a torque arm similar to 24 at each end of the brake beam.

By reference to Fig. 1, it will be seen that the joints at the ends of the brake beam extend substantially through the full transverse thickness of the beam, and the loads are, therefore, symmetrically carried by the side frames with respect to their central vertical planes so that the loads transmitted to the frames by the brake support have no tendency to swing the frames about a horizontal axis.

Figure 3:
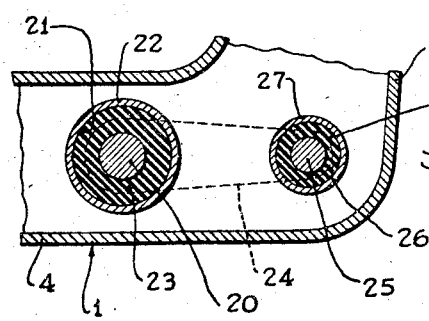
Fig. 3 is an enlarged detail sectional view taken substantially along the line 3—3 of Fig. 1.

By reference to Figs. 2 and 3, it will be seen that the joints 20, 22 and 23 are arranged in the horizontally extending portions 4 of the respective side frames 1 and joint 25, 26, 28 is in the region of the vertically extending portion 5, and by reference to Fig. 2, substantially in the same vertical transverse plane as the direction in which the resultant force acts on the shoe.

This arrangement has the advantage that the torque is transmitted to the side members in a region where they are exceedingly stiff against bending, and in a manner minimizing the bending strain on the side frame members incident to the braking torque.

While the invention has been herein described in a specific embodiment thereof, it will be understood that changes and modifications may be made by those skilled in the art without departing from the main features of the invention, and such changes and modifications are intended to be covered by the appended claims.

What is claimed is:

1. In a brake mechanism for vehicles, a wheel and axle assembly, longitudinally extending side members supported adjacent the opposite ends thereof, a brake rotor carried by said assembly, a brake stator adapted to cooperate with said rotor, and a support for said stator extending transversely between said side members and supported at its ends substantially in the vertical planes of symmetry of the respective side members through flexible joint structures arranged in said planes of the respective side members, at least one of said joint structures comprising spaced parts engaging the adjacent side member at spaced points, whereby to transmit braking torque to said member.

2. In a brake mechanism for vehicles, a wheel and axle assembly, longitudinally extending side members supported adjacent the opposite ends thereof, a brake rotor carried by said assembly, a brake stator adapted to cooperate with said rotor, and a support for said stator whose axis extends transversely between said side members and which is supported at its ends substantially in the vertical planes of symmetry of the respective side members through flexible joint structures arranged in said planes of the respective side members, at least one of which joint structures is extended in a direction at an angle to the axis of the support, whereby to transmit braking torque to the adjacent side member.

3. In a brake mechanism for vehicles, a wheel and axle assembly, longitudinally extending side members supported adjacent the opposite ends thereof, a brake rotor carried by said assembly, a brake stator adapted to cooperate with said rotor, a transverse support beam for said stator having its ends resting in recesses in the respective side members, yielding means interposed between the respective ends and the associated recesses, and torque transmitting means secured to said beam and extending laterally away from it and having engagement at its free end with an adjacent side member to transmit braking torque thereto.

4. In a brake mechanism for vehicles, a wheel and axle assembly, longitudinally extending side members supported adjacent the opposite ends thereof, a brake rotor carried by said assembly, a brake stator adapted to cooperate with said rotor, a transverse support beam for said stator having its ends resting in recesses in the respective side members, yielding bushings interposed between the respective ends and the associated recesses, and torque transmitting means secured to said beam and extending laterally away from it with its free end resting in a second recess in an adjacent side member, and a yielding bushing interposed between said free end and its associated recess.

5. In a brake mechanism for vehicles, a wheel and axle assembly, longitudinally extending side members supported from the opposite ends thereof and having a generally horizontally extending portion merging adjacent said assembly with a generally vertically extending portion, a brake rotor carried by said assembly, a brake stator adapted to cooperate with said rotor, a transversely extending support for said stator supported at its opposite ends substantially in the vertical planes of symmetry of the respective side members through flexible joint structures arranged in said planes of the respective side members, at least one of said joint structures comprising spaced parts, one disposed in the longitudinal region of the horizontally extending portion of the associated side member and the other in the longitudinal region of the vertically extending portion, said last-named part and the direction in which the resultant torque, generated between the rotor and stator, acts being both disposed substantially in the same vertical transverse plane, whereby bending strain on the side member due to braking torque is minimized.

CAROLUS L. EKSERGIAN.
PAUL W. GAENSSLE.

REFERENCES CITED

The following references are of record in the file of this patent:

UNITED STATES PATENTS

| Number | Name | Date |
|---|---|---|
| 2,365,460 | Eksergian et al. | Dec. 19, 1944 |